(12) United States Patent
Hawthorn et al.

(10) Patent No.: US 6,991,258 B2
(45) Date of Patent: Jan. 31, 2006

(54) FRONTAL AIR BAG SYSTEM (75) Inventors: Laura A. Hawthorn, Tipp City, OH (US); Michael W. Donegan, Bellbrook, OH (US); James L. Webber, Shelby Township, MI (US)

(73) Assignee: Delphi Technologies, Inc., Troy, MI (US)

( * ) Notice: Subject to any disclaimer, the term of this patent is extended or adjusted under 35 U.S.C. 154(b) by 204 days.

(21) Appl. No.: 10/078,961

(22) Filed: Feb. 20, 2002

(65) Prior Publication Data

US 2003/0155756 A1 Aug. 21, 2003

(51) Int. Cl.
*B60R 21/28* (2006.01)

(52) U.S. Cl. ..................................................... 280/742
(58) Field of Classification Search ............. 280/728.2, 280/732, 739, 738, 743.2, 743.1, 740, 742
See application file for complete search history.

(56) References Cited

U.S. PATENT DOCUMENTS

| | | | |
|---|---|---|---|
| 5,280,953 A | | 1/1994 | Wolanin et al. |
| 5,462,305 A | * | 10/1995 | Hamada ................... 280/728.2 |
| 5,489,119 A | | 2/1996 | Prescaro et al. ......... 280/743.2 |
| 5,746,447 A | | 5/1998 | Dyer et al. .............. 280/743.2 |
| 5,762,367 A | * | 6/1998 | Wolanin ..................... 280/736 |
| 5,788,267 A | * | 8/1998 | Lotspih et al. ........... 280/728.2 |
| 5,799,974 A | | 9/1998 | Honda |
| 5,887,894 A | | 3/1999 | Castagner et al. ....... 280/743.2 |
| 5,957,490 A | | 9/1999 | Sinnhuber ................... 280/735 |
| 6,095,557 A | * | 8/2000 | Takimoto et al. .......... 280/739 |
| 6,116,644 A | | 9/2000 | Viano et al. |
| 6,161,866 A | * | 12/2000 | Ryan et al. ................. 280/736 |
| 6,168,191 B1 | | 1/2001 | Webber et al. |
| 6,170,871 B1 | | 1/2001 | Goestenkors et al. .... 280/743.1 |
| 6,176,511 B1 | * | 1/2001 | Adkisson et al. ......... 280/728.2 |
| 6,186,540 B1 | | 2/2001 | Edgren ....................... 280/735 |
| 6,203,061 B1 | | 3/2001 | Niederman et al. ......... 280/736 |
| 6,213,502 B1 | | 4/2001 | Ryan et al. ................. 280/736 |
| 6,247,726 B1 | | 6/2001 | Ryan ........................... 280/739 |
| 6,250,677 B1 | | 6/2001 | Fujimura ................. 280/743.2 |
| 6,286,859 B2 | | 9/2001 | Derrick et al. ........... 280/728.2 |
| 6,308,983 B1 | * | 10/2001 | Sinnhuber ................... 280/735 |
| 6,315,323 B1 | * | 11/2001 | Pack, Jr. .................. 280/743.2 |
| 6,334,627 B1 | | 1/2002 | Heym et al. ............. 280/743.2 |
| 6,371,517 B1 | * | 4/2002 | Webber et al. .............. 280/736 |
| 6,390,501 B1 | | 5/2002 | Greib et al. .............. 280/743.2 |
| 6,409,209 B2 | | 6/2002 | Amamori et al. ......... 280/728.2 |
| 6,409,213 B2 | * | 6/2002 | Webber et al. .............. 280/739 |
| 6,419,267 B1 | | 7/2002 | Hashimoto et al. ...... 280/743.1 |
| 6,422,597 B1 | | 7/2002 | Pinsenschaum et al. .... 280/735 |
| 6,425,603 B1 | | 7/2002 | Eschbach ................. 280/743.2 |
| 6,431,583 B1 | | 8/2002 | Schneider ................ 280/728.2 |
| 6,431,596 B1 | | 8/2002 | Ryan et al. ................. 280/739 |
| 6,439,603 B2 | | 8/2002 | Damman et al. ........... 280/736 |

(Continued)

FOREIGN PATENT DOCUMENTS

| | | |
|---|---|---|
| DE | 19912369 | 10/2000 |
| EP | 1112902 | 7/2001 |
| GB | 2338214 | 12/1999 |

OTHER PUBLICATIONS

Copy of EP Search Report Dated Dec. 4, 2003.

*Primary Examiner*—Paul N. Dickson
(74) *Attorney, Agent, or Firm*—Scott A. McBain (57) ABSTRACT

A frontal air bag system for a vehicle includes an air bag module having a housing for mounting to vehicle structure of the vehicle and an air bag operatively connected to the air bag module. The frontal air bag system also includes an inflator disposed in the housing for inflating the air bag with an inflation gas. The frontal air bag system further includes at least one tether interconnecting the air bag and either one of the housing and the inflator to cause some of the inflation gas to vent through the housing to atmosphere.

20 Claims, 4 Drawing Sheets

U.S. PATENT DOCUMENTS

| | | |
|---|---|---|
| 6,454,300 B1 | 9/2002 | Dunkle et al. ............... 280/742 |
| 6,499,765 B2 | 12/2002 | Hawthorn et al. ....... 280/743.1 |
| 6,511,094 B2 | 1/2003 | Thomas et al. .......... 280/743.2 |
| 6,561,545 B2 | 5/2003 | Greib et al. ............. 280/743.2 |
| 6,592,146 B2 | 7/2003 | Pinsenschaum et al. . 280/743.2 |
| 6,616,184 B2 | 9/2003 | Fischer ................... 280/743.2 |
| 6,634,671 B2 | 10/2003 | Heigl et al. .............. 280/743.2 |
| 2002/0158456 A1 | 10/2002 | Fischer .................... 280/743.2 |
| 2004/0012179 A1 | 1/2004 | Pinsenschaum et al. .... 280/739 |
| 2004/0012180 A1 | 1/2004 | Hawthorn et al. .......... 280/739 |
| 2004/0051285 A1 | 3/2004 | Fischer ....................... 280/739 |
| 2004/0094941 A1 | 5/2004 | Waid et al. .................. 280/736 |
| 2004/0232677 A1 | 11/2004 | Fischer et al. .............. 280/739 |

* cited by examiner

FRONTAL AIR BAG SYSTEM

TECHNICAL FIELD

The present invention relates generally to inflatable restraint systems for vehicles and, more particularly, to a frontal air bag system for a vehicle.

BACKGROUND OF THE INVENTION

It is known to provide an inflatable restraint system in a vehicle for restraining a vehicle occupant. In some vehicles, the inflatable restraint system may be a passenger air bag system disposed within an occupant compartment in the vehicle in close proximity to either a driver occupant or one or more passenger occupants. Typically, the passenger air bag system includes a passenger air bag module attached to an instrument panel of the vehicle and having an air bag for deployment through an opening in the air bag module to extend in an occupant compartment of the vehicle. The deployed air bag typically interacts with the occupant during a collision.

It is also known to provide one or more vent openings in walls of the air bag to vent inflation gas from an interior of the air bag into the occupant compartment. These air bag vents are commonly provided in a base wall portion of the air bag to direct the vented gas away from the occupant. The vent opening may be provided by a gas permeable fabric panel sewn into the bag. In addition, it is known to employ various flow control devices to control the flow of inflation gas through the vent opening.

It is also known to provide a displacement responsive air bag vent. An example of such a displacement responsive air bag vent is disclosed in U.S. Pat. No. 5,280,953 to Wolanin et al. In this patent, a closure valve is associated with a vent opening in the air bag for selectively venting a portion of the inflation gas into the occupant compartment. A tether located in the air bag has a first end operatively associated with the closure valve and a second end attached to the air bag so that the inflation of the air bag pulls the tether to close the closure valve and contain the inflation gas within the air bag.

As a result, it is desirable to provide tether actuated venting for a frontal air bag system. It is also desirable to provide very large vents in a housing of an air bag module for the inflation gas to escape if an occupant is seated in close proximity to the air bag module. It is further desirable to provide full deployment of a frontal air bag when the occupant is normally seated. It is still further desirable to reduce the amount of venting for a normally seated occupant to a normal amount. Therefore, there is a need in the art to provide an improved frontal air bag system.

SUMMARY OF THE INVENTION

It is, therefore, one object of the present invention to provide a frontal air bag system for a vehicle.

It is another object of the present invention to provide a frontal air bag system with tether actuated venting.

It is yet another object of the present invention to provide a frontal air bag system with a vent closure in a housing for the air bag.

To achieve the foregoing objects, the present invention is a frontal air bag system for a vehicle including an air bag module having a housing for mounting to vehicle structure of the vehicle and an air bag operatively connected to the air bag module. The frontal air bag system also includes an inflator disposed in the housing for inflating the air bag with an inflation gas. The frontal air bag system further includes at least one tether interconnecting the air bag and either one of the housing and the inflator to cause some of the inflation gas to vent through the housing to atmosphere.

One advantage of the present invention is that an improved frontal air bag system is provided for a vehicle. Another advantage of the present invention is that the frontal air bag system provides relatively large vents in a housing for the air bag to allow inflation gas to escape if an occupant is in close proximity to the air bag module. Yet another advantage of the present invention is that the frontal air bag system provides full deployment of an air bag with at least one tether to pull a closure over the vents when the occupant is normally seated. Still another advantage of the present invention is that the frontal air bag system reduces the amount of venting for the normally seated occupant to a normal amount. A further advantage of the present invention is that the frontal air bag system has vents located in a housing, making them less variable and bulky. Yet a further advantage of the present invention is that the frontal air bag system has vents in the housing to aspirate and add to inflation gas in a normal deployment.

Other objects, features and advantages of the present invention will be readily appreciated, as the same becomes better understood, after reading the subsequent description taken in conjunction with the accompanying drawings.

DESCRIPTION OF THE PREFERRED EMBODIMENT

Figure 1:
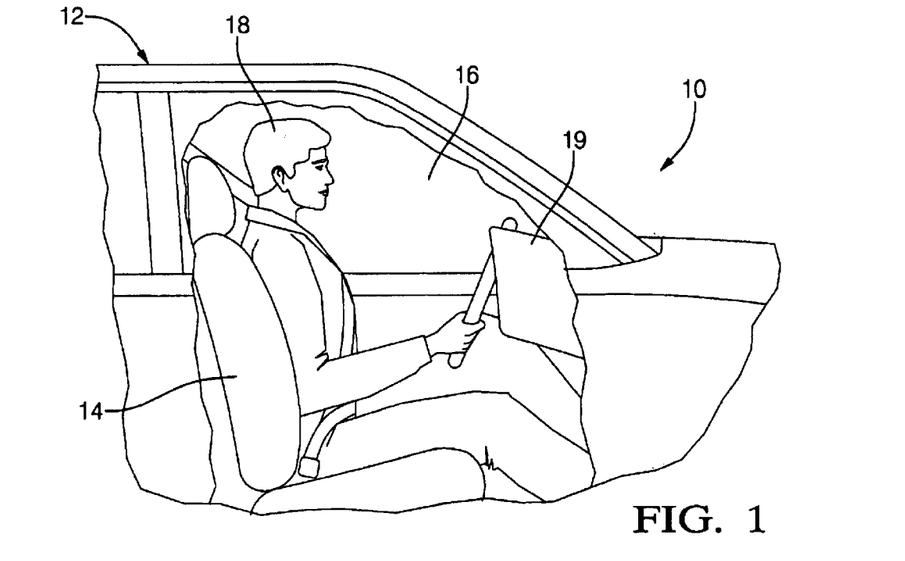
FIG. 1 is a side elevational view of a frontal air bag system, according to the present invention, illustrated in operational relationship with an occupant in a vehicle.
Figure 2:
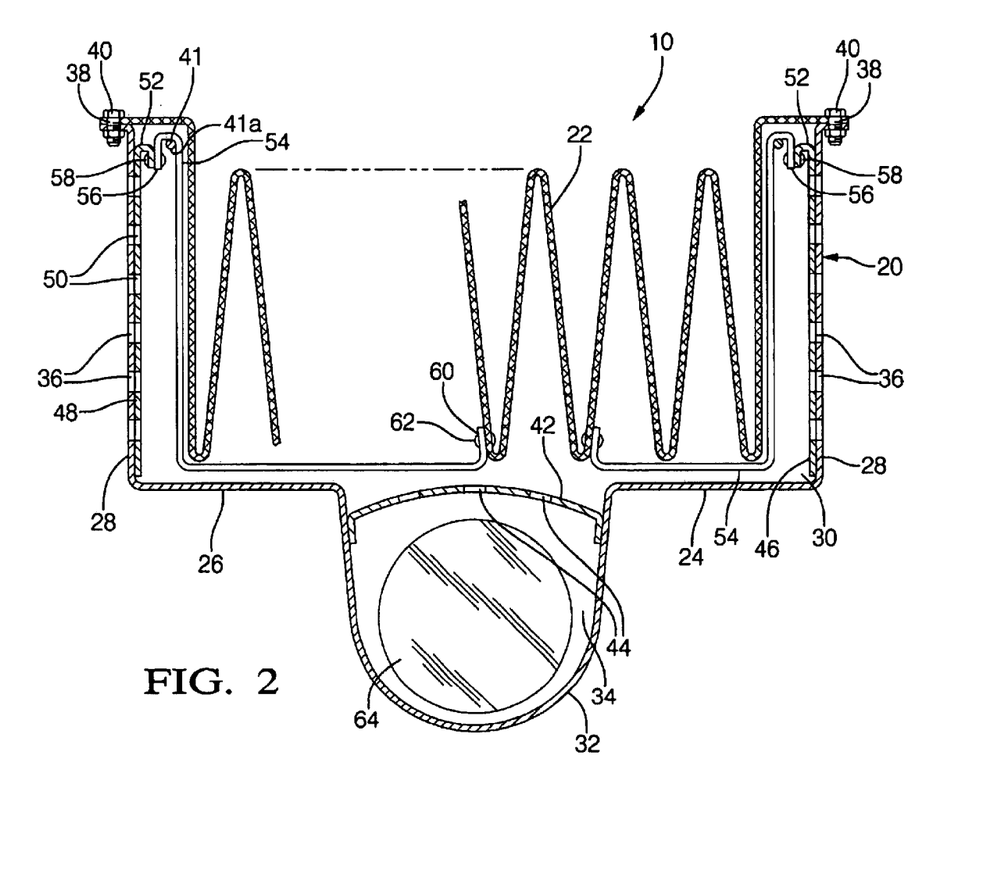
FIG. 2 is a fragmentary plan view of the frontal air bag system of FIG. 1.

Referring to the drawings and in particular FIGS. 1 and 2, one embodiment of a frontal air bag system 10, according to the present invention, is shown for a vehicle (partially shown), generally indicated at 12. The vehicle 12 includes a seat 14 mounted by suitable means (not shown) to vehicle structure (not shown) in an occupant compartment 16 of the vehicle 12. The vehicle 12 also includes a door (not shown) disposed adjacent the seat 14 and generally perpendicular thereto. The door is connected by suitable means (not shown) to vehicle structure (not shown). An occupant 18 is typically seated in the seat 14 adjacent the door. The vehicle 12 further includes an instrument panel 19 spaced forwardly from the seat 14 and extending laterally across the occupant compartment 16. It should be appreciated that, in the embodiment illustrated, the frontal air bag system 10 is mounted in the instrument panel 19 and acts as a frontal restraint for the occupant 18 on the passenger side of the occupant compartment 16. It should also be appreciated that the frontal air bag system 10 may be used for a driver, passenger or side air bag application. It should further be appreciated that, except for the frontal air bag system 10, the vehicle 12 is conventional and known in the art.

Referring to FIGS. 1 through 6, the frontal air bag system 10, according to the present invention, includes an air bag module, generally indicated at 20, mounted to the instrument panel 19 and an air bag 22 disposed within the air bag module 20 for deployment rearwardly toward the occupant 18. The air bag 22 is a single panel having a generally rectangular shape. The air bag 22 is made of a fabric material such as nylon or polyester as is known in the art.

The air bag module 20 includes an outer housing 24 mounted to the instrument panel 19 by suitable means such as fasteners (not shown). The outer housing 24 is generally rectangular in shape and made of a rigid material such as plastic. The outer housing 24 has a base wall 26 extending laterally and a plurality of side walls 28 extending generally perpendicular to the base wall 26 to form a chamber 30 therein. The base wall 26 also has a recessed portion 32 extending away from the chamber 30 and having a generally "U" shape to form an inflator cavity 34. The side walls 28 have a plurality of apertures or vents 36 extending therethrough for a function to be described. The side walls 28 also have an outer flange 38 extending laterally outwardly and generally perpendicularly to the side walls 28 at a free end thereof. The air bag 22 has an edge secured to the outer flange 38 by suitable means such as fasteners 40. The side walls 28 may also have an inner flange 41 extending laterally outwardly and generally perpendicularly to the side walls 28 with an aperture 41a extending therethrough for a function to be described. The outer housing 24 is a monolithic structure being integral, unitary and one-piece. It should be appreciated that the side walls 28 would be perforated with rows of vents 36. It should further be appreciated that a door or cover (not shown) closes the open end of the outer housing 24.

The air bag module 20 also includes an inflator or diffuser panel 42 extending across the inflator cavity 34 and secured to the recessed portion 32 of the base wall 26 by suitable means such as fasteners (not shown). The inflator panel 42 has a plurality of apertures 44 extending therethrough for a function to be described. The inflator panel 42 is made of rigid material such as plastic.

The air bag module 20 includes an inner housing 46 disposed in the chamber 30 of the outer housing 24. The inner housing 46 has a plurality of side walls 48 extending through the apertures 41a in the inner flanges 41 of the side walls 28 and forming a generally rectangular shape with open ends. The side walls 48 have a plurality of apertures or vents 50 extending therethrough that are aligned initially with the vents 36 in the outer housing 24 when the inner housing 46 is in a predetermined position relative to the outer housing 24. The side walls 48 have a flange 52 extending laterally inward and generally perpendicular to the side walls 48 at a one end adjacent the open end of the outer housing 24 for a function to be described. It should be appreciated that the side walls 48 would be perforated with rows of vents 50.

The frontal air bag system 10 includes at least one, preferably a plurality of tethers 54 interconnecting the air bag 22 and the inner housing 46. Each of the tethers 54 have a first end 56 connected to one of the flanges 52 of the side walls 48 by suitable means such as fasteners 58. Each of the tethers 54 have a second end 60 connected to a mid portion of the air bag 22 by suitable means such as fasteners 62. It should be appreciated that inflation of the air bag 22 pulls the tethers 54 taunt to move the inner housing 46 relative to the outer housing 20.

The frontal air bag system 10 further includes an inflator 64 disposed in the inflator cavity 34 between the recessed portion 32 of the base wall 26 and the inflator panel 42 for inflating the air bag 20. The inflator 64 extends axially along the inflator cavity 34 and is generally cylindrical in shape. The inflator 64 may include an inflator bracket (not shown) to mount the inflator 64 to the base wall 26 of the outer housing 20 by suitable means such as fasteners (not shown). The inflator 64 includes a central pyrotechnic unit and may include a rupture disc or diffuser (not shown) having a plurality of apertures (not shown) to allow the gas to pass therethrough. The inflator 64 includes an electrical connector (not shown) connected to a source of power (not shown) for activating the central pyrotechnic unit. It should be appreciated that the central pyrotechnic unit of the inflator 64 is activated by the source of power to expel a gas into the inflator cavity 34 and through the apertures 44 in the inflator panel 42 to inflate the air bag 22.

Figure 3:
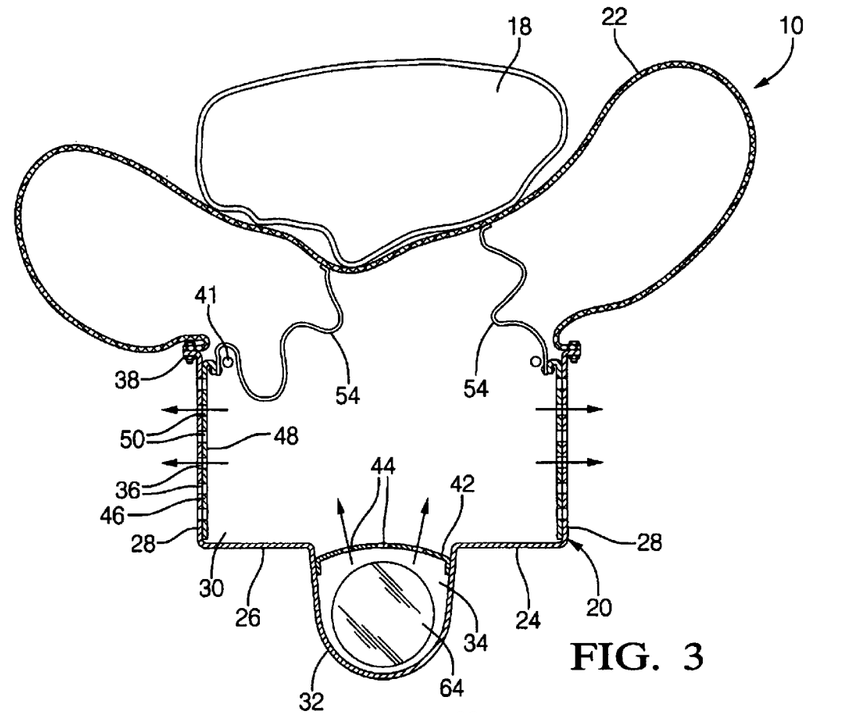
FIG. 3 is a view similar to FIG. 2 illustrating a first operational state of the frontal air bag system of FIG. 1.

In operation, the frontal air bag system 10 is mounted in the instrument panel 19 and the air bag 22 is in a folded stowed position as illustrated in FIG. 2. The vents 50 in the inner housing 46 are aligned with the vents 36 in the outer housing 24. When the vehicle 12 experiences a collision-indicating condition of at least a predetermined threshold level, an electrical signal is sent to the inflator 64. The inflator 64 is activated and a gas is expelled by the central pyrotechnic unit into the inflator cavity 34 and through the apertures 44 in the inflator panel 42 and into the air bag 22 as indicated by the arrows in FIG. 3. Gas enters the air bag 22 and does not initially escape through the vents 36 and 50 because of interference between the material of the air bag 22 and the vents 36 and 50. The air bag 22 deploys as it is filled to extend into the occupant compartment 16 of the vehicle 12 between the occupant 18 and the instrument panel 19 as illustrated in FIG. 3. The tethers 54 have slack and the vents 36 and 50 are aligned so that the gas can escape to atmosphere. It should be appreciated that once the air bag 22 is partially deployed the gas would aspirate or exhaust through the vents 50 and 36, which are still aligned, as indicated by the arrows in FIG. 3.

Figure 4:
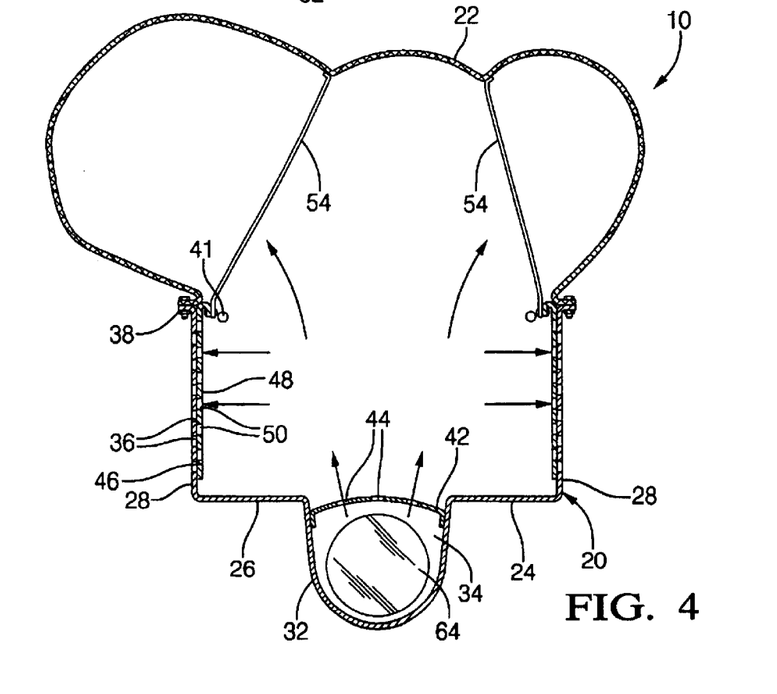
FIG. 4 is a view similar to FIG. 2 illustrating a second operational state of the frontal air bag system of FIG. 2.

The vents 36 and 50 exhaust or vent gas if the occupant 18 is in close proximity and seated in the seat 14 to avoid building pressure in the air bag 22 early in the deployment. Otherwise, when the occupant 18 is normally seated in the seat 14, the vents 36 and 50 would aspirate for a few milliseconds until the tethers 54 are pulled taunt. Once taunt, upon further inflation and deployment of the air bag 22, the tethers 54 pull the inner housing 46 up slightly to a closed position relative to the outer housing 24 where the vents 36 and 50 do not line up and the gas cannot escape through the outer housing 24 as illustrated in FIG. 4. The occupant 18 will typically interact with the deployed air bag 22.

Figure 5:
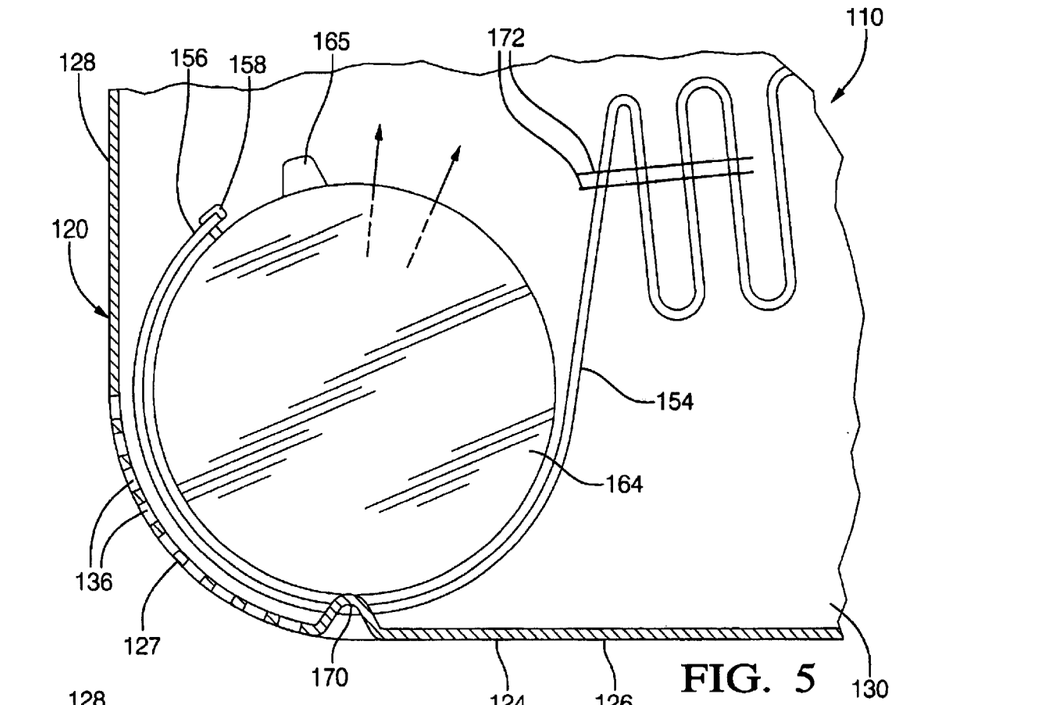
FIG. 5 is an enlarged view of a portion of another embodiment, according to the present invention, of the frontal air bag system of FIG. 2 illustrating the first operational state.
Figure 6:
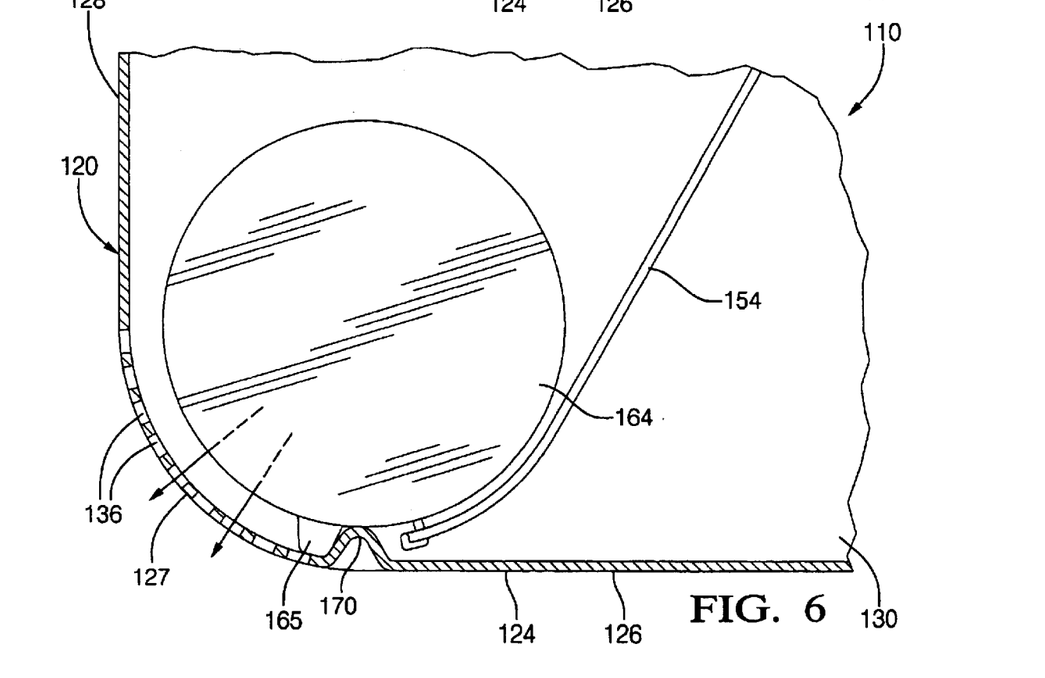
FIG. 6 is a view similar to FIG. 5 illustrating the second operational state of the frontal air bag system of FIG. 5.

Referring to FIGS. 5 and 6, another embodiment 110, according to the present invention, of the frontal air bag system 10 is shown. Like parts of the frontal air bag system 10 have like reference numerals increased by one hundred (100). In this embodiment, the frontal air bag system 110 eliminates the inner housing and recessed portion of the outer housing 124. The outer housing 124 has the base wall 126 and side wall 128 forming an arcuate corner portion 127 therebetween. The corner portion 127 has the vents 136 extending therethrough. The outer housing 124 has a rib or projection 170 extending into the chamber 130. The frontal air bag system 110 has the inflator 164 disposed adjacent the corner portion 127 and includes a rib or projection 165 extending outwardly to cooperate with the rib 170 on the outer housing 124. The frontal air bag system 110 has the first end 156 of the tether 154 connected to the inflator 164 by suitable means such as the fastener 158 and the second end is connected to the air bag. The frontal air bag system 110 may also include one or more break-away stitches 172 in the tether 154 for a function to be described.

In operation, the frontal air bag system 110 is mounted in the instrument panel 19 and the air bag is in a folded stowed position as illustrated in FIG. 5. When the vehicle 12 experiences a collision-indicating condition of at least a predetermined threshold level, an electrical signal is sent to the inflator 164. The inflator 164 is activated and a gas is expelled by the central pyrotechnic unit into the chamber 130 and into the air bag as indicated by the arrows in FIG. 5. Gas enters the air bag and fills to deploy the air bag. The air bag deploys as it is filled to extend into the occupant compartment 16 of the vehicle 12 between the occupant 18 and the instrument panel 19. When the occupant 18 is normally seated in the seat 14, a normal deployment of the air bag pulls on the tethers 154 to rotate the inflator 164 to align the inflator 164 with the vents 136 in the corner portion 127 of the outer housing 124. Gas aspirates through the vents 136 for a few milliseconds until the projection 165 contacts the projection 170 and the tethers 154 are initially pulled taunt as illustrated in FIG. 6. Once initially taunt, upon further inflation and deployment of the air bag, the tethers 154 pull apart or break the break away stitches 172 and pull the tethers 154 fully taunt. Once fully taunt, the tethers 154 pull or rotate the projection 165 on the inflator 164 past the projection 170 on the outer housing 124 and the gas cannot escape through the outer housing 124, but continues to inflate the air bag to full deployment. The occupant 18 will typically interact with the deployed air bag. It should be appreciated that the corner portion 127 may not include the vents 136 and that the inflator panel or the tethers 154 themselves may include the vents 136 and cover the inflator 164 to vent the gas in an initial position before the inflator 164 is rotated.

Figure 7:
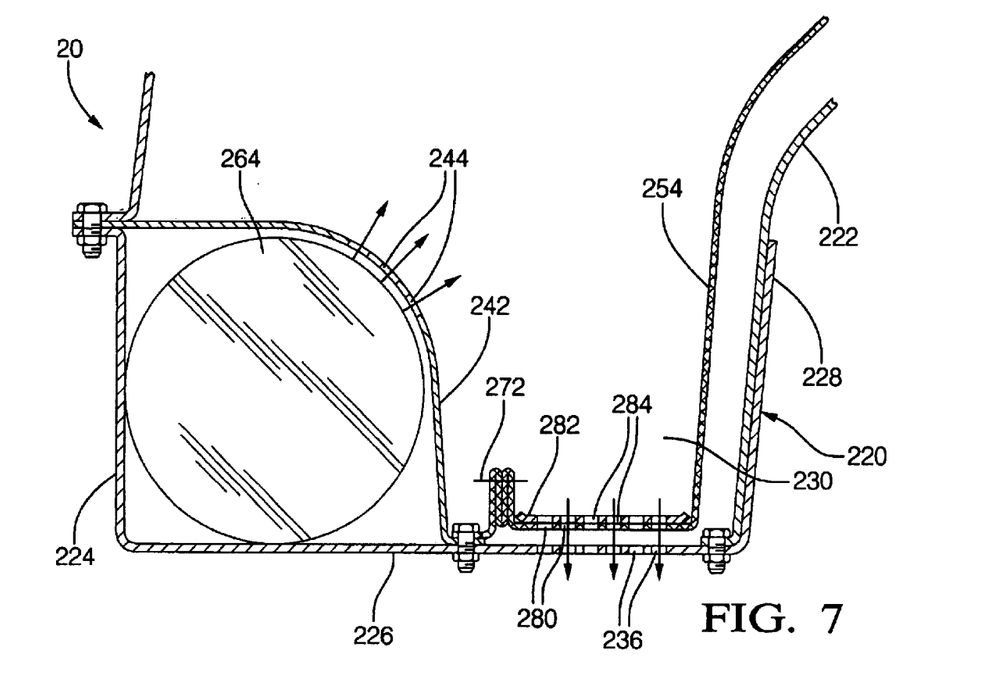
FIGS. 7 and 8 are enlarged views of a portion of yet another embodiment, according to the present invention, of the front air bag system of FIG. 2 illustrating first and second operational states thereof.
Figure 8:
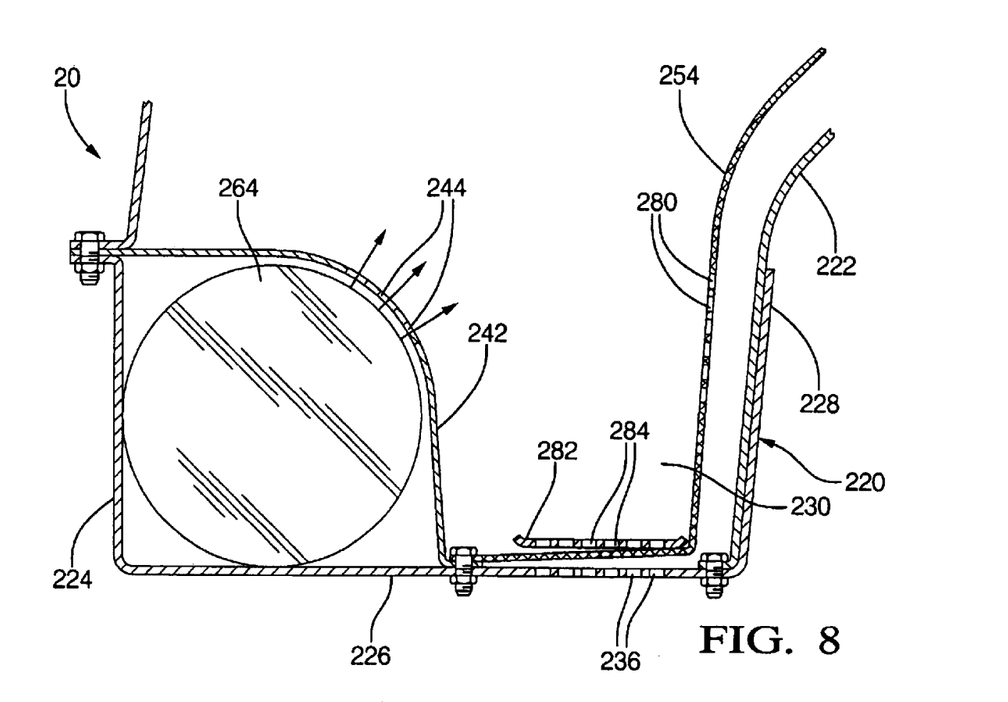

Referring to FIGS. 7 and 8, yet another embodiment 210, according to the present invention, of the frontal air bag system 10 is shown. Like parts of the frontal air bag system 10 have like reference numerals increased by two hundred (200). In this embodiment, the frontal air bag system 210 eliminates the inner housing and recessed portion of the outer housing 224. The outer housing 224 has the base wall 226 with the vents 236 extending therethrough. The frontal air bag system 210 has the inflator 264 disposed adjacent the corner of the housing 224 and the inflator panel 242 has apertures 244 aligned with the gas diffusing from the inflator 264. The frontal air bag system 210 has the first end 256 of the tether 254 connected to the base wall 226 of the housing 224 by suitable means such as the fastener 258 and the second end is connected to the air bag 222. The tether 254 has one or more vents or apertures 280 extending through a portion thereof. The frontal air bag system 210 also includes one or more break-away stitches 272 in the tether 254 to align the vents 280 of the tether 254 with the vents 236 of the housing 224 in an initial position for a function to be described. The frontal air bag system 210 may include a retainer 282 connected to the housing 226 to retain the tether 254 in its initial position. The retainer 282 has a plurality of apertures 284 aligned with the vents 280 and 236.

In operation, the frontal air bag system 210 is mounted in the instrument panel 19 and the air bag 222 is in a folded stowed position as illustrated in FIG. 7. The vents 280 in the tether 254 are aligned with the vents 236 in the outer housing 224. When the vehicle 12 experiences a collision-indicating condition of at least a predetermined threshold level, an electrical signal is sent to the inflator 264. The inflator 264 is activated and a gas is expelled by the central pyrotechnic unit through the apertures 244 in the inflator panel 242 into the chamber 230 and into the air bag 222 as indicated by the arrows in FIG. 7. Gas enters the air bag 222 and fills to deploy the air bag 222. The air bag 222 deploys as it is filled to extend into the occupant compartment 16 of the vehicle 12 between the occupant 18 and the instrument panel 19. The tethers 254 have slack and the vents 236 and 280 are aligned with the apertures 284 in the retainer 282 so that the gas can escape to atmosphere. It should be appreciated that once the air bag 222 is partially deployed the gas would aspirate or exhaust through the vents 280 and 236, which are still aligned, as indicated by the arrows in FIG. 7.

The vents 236 and 280 exhaust or vent gas if the occupant 18 is in close proximity and seated in the seat 14 to avoid building pressure in the air bag 222 early in the deployment. Otherwise, when the occupant 18 is normally seated in the seat 14, the vents 236 and 238 would aspirate for a few milliseconds until the tethers 254 are pulled taunt. Once taunt, upon further inflation and deployment of the air bag 222, the tethers 254 pull apart or break the break away stitches 272 and pull the tethers 254 fully taunt where the vents 236 and 280 do not line up and the gas cannot escape through the outer housing 224 as illustrated in FIG. 8. The occupant 18 will typically interact with the deployed air bag 222.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A frontal air bag system for a vehicle, comprising:
   an air bag module having a housing, said housing having at least one vent extending therethrough;
   an air bag operatively connected to said air bag module;
   an inflator disposed in said air bag module for inflating said air bag with an inflation gas; and
   at least one tether interconnecting said air bag and either one of said housing and said inflator to cause some of the inflation gas to vent through the at least one vent of said housing to atmosphere outside of said air bag, wherein the at least one tether is configured to only allow venting during an initial deployment of the air bag and thereafter the tether is pulled by the air bag to a position wherein the tether no longer allows venting through the at least one vent of the housing.

2. A frontal air bag system as set forth in claim 1 wherein said housing has a base wall and a plurality of side walls extending generally perpendicularly from said base wall, said at least one vent of said housing extending through said side walls.

3. A frontal air bag system as set forth in claim 1, wherein said housing further comprises an inflator panel disposed over said inflator and connected to an outer housing and having a plurality of apertures extending therethrough.

4. A frontal air bag system as set forth in claim 1 wherein said housing comprises an outer housing has a base wall and a side wall and a corner portion interconnecting said base wall and said side wall, said plurality of vents of said outer housing extending through said corner portion.

5. A frontal air bag system as set forth in claim 4 wherein said base wall has a first projection.

6. A frontal air bag system as set forth in claim 5 wherein said inflator has a second projection to cooperate with said first projection.

7. A frontal air bag system as in claim 1, wherein said housing further comprises a retainer for retaining the tether in an initial position corresponding to the air bag being in an un-deployed state.

8. A frontal air bag system as set forth in claim 7, wherein the retainer comprises at least one opening for aligning with the at least one opening of the housing and at least one opening of the tether.

9. A frontal air bag system as set forth in claim 7, wherein restraint of the air bag during deployment will allow the tether and the at least one vent opening to continue to allow venting of the inflation gas.

10. A frontal air bag system for a vehicle comprising:
an air bag module having a housing;
an air bag operatively connected to said air bag module;
an inflator disposed in said housing for inflating said air bag with an inflation gas;
at least one tether interconnecting said air bag and either one of said housing and said inflator to cause some of the inflation gas to vent through said housing to atmosphere; and
said housing comprising an outer housing having a plurality of walls and a plurality of vents extending through at least one of said side walls and an inner housing disposed within said outer housing and having a plurality of vents extending therethrough and aligned with said vents of said outer housing when said inner housing is in an initial position relative to said outer housing.

11. A frontal air bag system for a vehicle comprising:
an air bag module having a housing;
an air bag operatively connected to said air bag module;
an inflator disposed in said housing for inflating said air bag with an inflation gas;
at least one tether interconnecting said air bag and either one of said housing and said inflator to cause some of the inflation gas to vent through said housing to atmosphere; and
wherein said at least one tether has a first end connected to said inflator and a second end connected to said air bag to rotate said inflator upon inflation of said air bag by said inflator.

12. A frontal air bag system as set forth in claim 11 including at least one break-away stitch in said at least one tether to stitch a portion of said at least one tether together until broken when said first projection contacts said second projection.

13. A frontal air bag system for a vehicle comprising:
an air bag module having a housing;
an air bag operatively connected to said air bag module;
an inflator disposed in said housing for inflating said air bag with an inflation gas;
at least one tether interconnecting said air bag and either one of said housing and said inflator to cause some of the inflation gas to vent through said housing to atmosphere;
said housing having a plurality of vents extending therethrough; and
wherein said at least one tether has a plurality of vents extending therethrough and aligned with said vents of said outer housing when at least one tether is in an initial position relative to said outer housing.

14. A frontal air bag system for a vehicle comprising:
an air bag module having a housing, said housing comprising an inner housing and an outer housing, said outer housing having a plurality of vents extending therethrough;
an air bag operatively connected to said housing;
an inflator disposed in said housing for inflating said air bag with an inflation gas; and
a plurality of tethers interconnecting said air bag and either one of said housing and said inflator to cause some of the inflation gas to vent through said vents in said outer housing to atmosphere outside of said air bag,
wherein said outer housing has a base wall and a plurality of side walls extending generally perpendicularly from said base wall, said plurality of vents extending through said side walls.

15. A frontal air bag system for a vehicle comprising:
an air bag module having a housing, said housing having a plurality of vents extending therethrough;
an air bag operatively connected to said housing;
an inflator disposed in said housing for inflating said air bag with an inflation gas;
a plurality of tethers interconnecting said air bag and either one of said housing and said inflator to cause some of the inflation gas to vent through said vents in said housing to atmosphere;
said housing comprising an outer housing having a plurality of walls with said vents extending through at least one of said walls; and
wherein said housing includes an inner housing disposed within said outer housing and having a plurality of vents extending therethrough and aligned with said vents of said outer housing when said inner housing is in an initial position relative to said outer housing.

16. A frontal air bag system as set forth in claim 15 wherein each of said tethers has a first end connected to said inner housing and a second end connected to said air bag.

17. A frontal air bag system for a vehicle comprising:
an air bag module having a housing, said housing comprising an inner housing and an outer housing, said outer housing having a plurality of vents extending therethrough;
an air bag operatively connected to said housing;
an inflator disposed in said housing for inflating said air bag with an inflation gas; and
a plurality of tethers interconnecting said air bag and either one of said housing and said inflator to cause some of the inflation gas to vent through said vents in said outer housing to atmosphere outside of said air bag,
wherein said outer housing has a base wall and a side wall and a corner portion interconnecting said base wall and said side wall, said plurality of vents extending through said corner portion.

18. A frontal air bag system for a vehicle comprising:
an air bag module having a housing, said housing having a plurality of vents extending therethrough;

an air bag operatively connected to said housing;

an inflator disposed in said housing for inflating said air bag with an inflation gas;

a plurality of tethers interconnecting said air bag and either one of said housing and said inflator to cause some of the inflation gas to vent through said vents in said housing to atmosphere; and wherein each of said tethers has a first end connected to said inflator and a second end connected to said air bag to rotate said inflator upon deployment.

19. A frontal air bag system for a vehicle comprising:

an air bag module having a housing, said housing having a plurality of vents extending therethrough;

an air bag operatively connected to said housing;

an inflator disposed in said housing for inflating said air bag with an inflation gas;

a plurality of tethers interconnecting said air bag and either one of said housing and said inflator to cause some of the inflation gas to vent through said vents in said housing to atmosphere;

said housing comprising an outer housing having a plurality of walls with said vents extending through at least one of said walls; and wherein said at least one tether has a plurality of vents extending therethrough and aligned with said vents of said outer housing when at least one tether is in an initial position relative to said outer housing.

20. A frontal air bag system for a vehicle comprising:

an air bag module having an outer housing, said outer housing having a plurality of vents extending therethrough;

an air bag operatively connected to said outer housing;

an inflator disposed in said outer housing for inflating said air bag with an inflation gas; and a plurality of tethers having a first end connected to said air bag and a second end operatively connected to either one of said outer housing and said inflator, wherein said tethers allow some of the inflation gas to vent through said vents in said outer housing to atmosphere outside of said air bag and said tethers move to close said vents to prevent inflation gas from venting through said vents.

\* \* \* \* \*